United States Patent Office 2,832,043
Patented Apr. 22, 1958

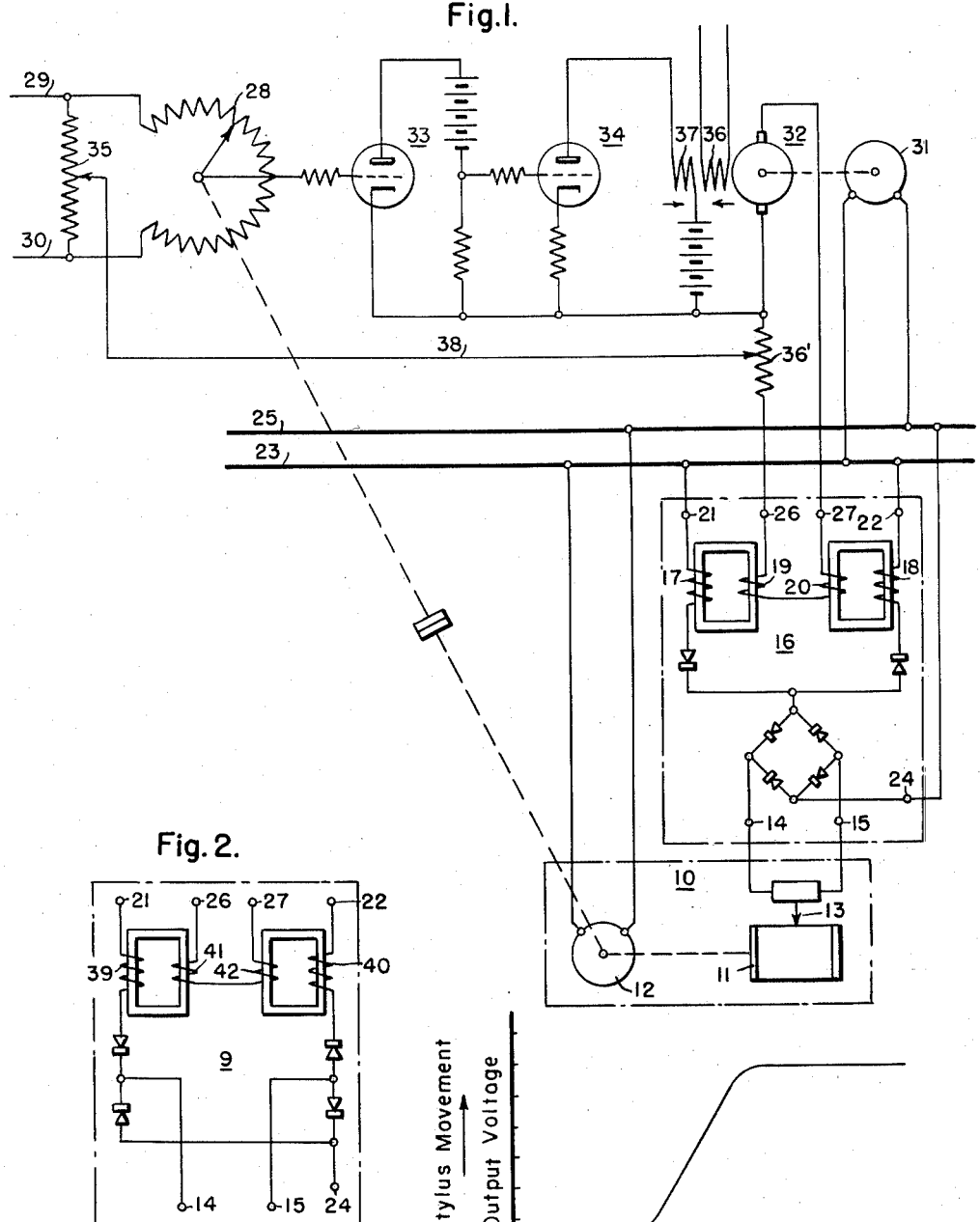

2,832,043

TRANSFER CURVE PLOTTER FOR SATURABLE CORE IMPEDANCE DEVICES

Robert E. Hull, Buffalo, and Willard M. Brittain, Erie, N. Y., assignors to Westinghouse Electric Corporation, East Pittsburgh, Pa., a corporation of Pennsylvania Application November 25, 1953, Serial No. 394,249

8 Claims. (Cl. 324—57)

This invention relates to recording apparatus and, more particularly, to apparatus for plotting the relationship of the input control units to output units of current or voltage, which is commonly known as transfer curve data, for saturable core impedance devices.

Present day requirements for quantity production of saturable core impedance devices such as magnetic amplifiers has shown a need for a fast and automatic method to obtain transfer curve information. Because of variations found between units, transfer curves must be taken for each unit. The present method of adjusting circuits, reading meters, taking data, and plotting lengthy sets of transfer curves is too time consuming and inaccurate to be practical on a production basis.

One object of this invention is to provide apparatus for automatically recording electrical data.

A more specific object of this invention is to provide a means for automatically recording transfer curve data for saturable core impedance devices.

Another object of this invention is to provide a device of the character referred to which is reliable and positive in action.

The objects stated are merely illustrative. These and other objects will become more apparent from a study of the specification and the accompanying drawings, in which:

Figure 1 shows diagrammatically the system used in the preferred embodiment of the invention;

Fig. 2 shows diagrammatically another type of saturable core impedance device which may be tested in the system of Fig. 1; and Fig. 3 shows a typical transfer curved plotted by the system shown in Fig. 1.

The transfer curve plotting system utilizes a continuously recording instrument 10 which has a recording surface, or chart, 11 driven by a motor 12 under a stylus or other recording mechanism 13. The position of the recording mechanism 13 on the recording surface 11 is determined by the voltage across its input terminals 14 and 15. In the circuit of Fig. 1 the terminals 14 and 15 are supplied from the output of a magnetic amplifier 16 to be tested which is of the doubler type. The magnetic amplifier 16 has main windings 17 and 18 and control windings 19 and 20. The main windings 17 and 18 have terminals 21 and 22 which are connected to one lead 23. The other input terminal 24 of the magnetic amplifier 16 is connected to the lead 25. The leads 23 and 25 are energized from an alternating-current source having a constant voltage and constant frequency. The constant speed driving motor 12 of the continuously recording instrument 10 is also energized from the alternating-current source which is connected to the leads 23 and 25 although the instrument may be mechanically driven.

By using an accurate servo system to supply control current to the terminals 26 and 27, and thus to the control windings 19 and 20 of the magnetic amplifier 16, as a linear function of the travel of the chart 11 of the continuously recording instrument, the recorder will produce a transfer curve for the magnetic amplifier. The travel of the chart 11 may be calibrated in control units and the position of the recording mechanism 13 in output amperes or volts. That is, the servo system is so fixed that it varies the magnitude of the control units for the saturable core impedance device as a linear function of the distance of travel of the chart 11 and the output of the saturable core impedance device determines the lateral position of the recording mechanism 13 with respect to the chart. Reference may be had to Fig. 3 for a typical transfer curve plotted with the apparatus of Fig. 1 and for the correction between the chart travel and control ampere turns or current along the axis of abscissae and the position of the recording mechanism and the output voltage of the magnetic amplifier along the axis of the ordinates.

The servo system shown in Fig. 1 utilizes a 270° potentiometer 28 having a constant direct current reference voltage applied at its extremities by the leads 29 and 30. The 270° potentiometer 28 is provided with a slip clutch so that the potentiometer tap will be rotated the full 270° and then reset so the tap may be rotated continuously. The potentiometer 28 might also be a 360° potentiometer or any other suitable type. A small motor-generator set is provided to supply control current to the magnetic amplifier 16. The constant speed motor 31 is energized from the leads 23 and 25 and drives the generator 32. The output of the generator 32 is connected to the terminals 26 and 27 of the magnetic amplifier 16. A stage of voltage amplification 33 and a stage of power amplification 34 completes the regulating loop of the servo system.

The control current to the control windings 19 and 20 of the magnetic amplifier 16 is made a linear function of the travel of chart 11 by making the 270° potentiometer 28 linear and mechanically coupling the tap of the 270° potentiometer 28 to the motor 12 of the continuously recording instrument 10 so that the tap is driven as a function of the speed of the motor 12. The grid bias for the vacuum tube utilized in the voltage amplifier 33 is determined in part by the position of the tap of the 270° potentiometer 28, therefore the relationship of the grid bias to the chart travel is a function of the winding of the potentiometer 28. Since the potentiometer used is preferably linear, the grid bias for the vacuum tube utilized in the voltage amplifier 33 is a linear function of chart travel. The grid bias determines the output of the voltage amplifier 33 and as a consequence the output of the power amplifier 34 is a linear function of chart travel. It may readily be seen that any other function of grid bias to chart travel can be obtained by proper selection of the potentiometer, that is a sine function or log function may be obtained by use of a sine or log potentiometer respectively.

The generator 32 has two sets of field windings 36 and 37 respectively. The field winding 36 is energized from a source of constant direct current potential while the field winding 37 is energized from the output of the power amplifier 34. The field winding 36 is energized in such a way as to cause a magnetic field which is differential with respect to that which is caused by the field winding 37. The magnitude of the energizing source for the field winding 36 is adjusted to permit sufficient negative control range of the generator output to run the magnetic amplifier 16 well into cut off.

The power amplifier 34 is controlled by the voltage amplifier 33, and since the grid bias of the input stage of the voltage amplifier 33 is controlled as a linear function of the travel of the chart 11 of the continuously recording instrument 10, the excitation of the field winding 37 and consequently the control current for the magnetic amplifier 16 is a linear function of the travel of the chart 11. The chart travel is calibrated in control units for the control windings 19 and 20 of the magnetic amplifier 16 and the position of the recording device 13 of the continuously recording instrument 10 is calibrated in output amperes or volts, so that transfer curves may be plotted continuously and thus families of curves can be quickly obtained for various operating conditions. In order to reduce variations in magnetic amplifier output that are not a function of the control current, no bias is used on the magnetic amplifier while plotting a transfer curve.

A second potentiometer 35 is connected across the leads 29 and 30 in parallel with the 270° potentiometer 28 and a third potentiometer 36' is provided in series with the control windings 19 and 20 of magnetic amplifier 16.

The actual grid bias on the input stage of the voltage amplifier 33 is determined by the voltage across the individual components of the grid circuit which comprises a circuit from the grid through the tap of the 270° potentiometer 28 through the lower portion of the 270° potentiometer 28, the lower portion of the potentiometer 35 connected in parallel with it, the tap of the potentiometer 35, lead 38, the tap and upper portion of potentiometer 36' to the cathode. The potentiometer 36' is adjusted to set the desired control current range for the magnetic amplifier to be tested and so that a given distance of travel of the chart 11 will represent a given number of control ampere turns or amperes of control current. The potentiometer 35 is adjusted to set the desired zero control current position on the chart travel scale to thus determine the amount of negative control on the control windings 19 and 20 of the magnetic amplifier 16. Potentiometer 35, then, can be adjusted so that a complete transfer curve can be obtained or to investigate the transfer curve in the cut off range or the saturation range.

Rotation of the tap of the 270° potentiometer 28 takes the grid bias of the vacuum tube of the voltage amplifier 33 through a complete cycle to thus vary the energization of the field winding 37 from zero to a maximum and consequently take the control current of the magnetic amplifier 16 through a complete cycle to obtain a complete transfer curve, that is, from the amount of negative control as selected by the position of the tap on the potentiometer 35 to the maximum positive control. Current regulation in the circuit of control windings 19 and 20 of the magnetic amplifier 16 is obtained by comparing the voltage across the portion of the potentiometer 36' in the magnetic amplifier control circuit with the reference voltage which is determined by the position of the tap on the 270° potentiometer 28.

Transfer curves for other types of saturable core impedance devices may be plotted using the system just described. For example, Fig. 2 shows a full wave bridge type magnetic amplifier 9 having main windings 39 and 40 and control windings 41 and 42. The transfer curves of the full wave bridge type magnetic amplifier 9 may be plotted in exactly the same manner described for the doubler type magnetic amplifier 16 by simply substituting the full wave bridge magnetic amplifier 9 in the circuit instead of the doubler type magnetic amplifier 16. The corresponding terminals for the two magnetic amplifiers are given the same numbers. The system is equally applicable for transfer curves for other type saturable core impedance devices.

It will be recognized that the objects of this invention have been accomplished by providing apparatus for automatically recording transfer curve data for saturable core impedance devices, which will meet the accuracy and speed requirements for testing saturable core impedance devices on a production basis.

While in accordance with the patent statutes one best known embodiment of the invention has been shown and described in detail, it is to be particularly understood that equivalents are within the inventive scope.

We claim as our invention:

1. A servo-system to provide control current to a saturable core impedance device as a function of chart travel for a continuously recording instrument, comprising, in combination, an impedance device adapted to be connected across a power source, said impedance device having a movable tap, coupling means connecting the movable tap of said impedance device to the driving means for the continuously recording instrument, amplifying means connected to said impedance device adapted to have its output controlled in accordance with the position of said movable tap on said impedance device, a generator being connected to vary the control units for the saturable core impedance device, the recording stylus of said continuously recording instrument being operatively connected to said saturable core impedance device to have its position determined by the output of the saturable core impedance device, excitation means for said generator, said excitation means being connected to be energized by the output of said amplifying means.

2. A servo-system to provide control current to a saturable core impedance device as a function of chart travel for a continuously recording instrument having a movable chart and a stylus engaging the chart, comprising, in combination, a pair of energized buses, an impedance device adapted to be connected across said buses, said impedance device having a movable tap, coupling means connecting the movable tap of said impedance device to the chart driving means for the continuously recording instrument, amplifying means connected to said tap to thus have its output controlled in accordance with the position of said movable tap on said impedance device, a generator having its output terminals connected to vary the control units for the saturable core impedance device, the stylus of the recording device of said continuously recording instrument being connected to the saturable core impedance device to have its position determined by the output of the saturable core impedance device, first and second excitation means for said generator, said first excitation means being connected to receive a constant excitation, said second excitation means being connected to receive the output of said amplifying means and control the output of said generator in accordance therewith.

3. A servo-system to provide control current to a saturable core impedance device as a function of chart travel for a continuously recording instrument having a movable chart and stylus engaging the chart, comprising, in combination, a pair of energized buses, an impedance device adapted to be connected across said buses, said impedance device having a movable tap, coupling means connecting the movable tap of said impedance device to the driving means for the chart of the continuously recording instrument, electronic amplifying means having its grid connected to the tap to thus have its grid bias determined in accordance with the position of said movable tap on said impedance device, a generator having its output terminals connected to vary the control units for the saturable core impedance device, the stylus of the recording device of said continuously recording instrument being connected to the saturable core impedance device to have its position determined by the output of the saturable core impedance device, first and second excitation means for said generator, said first excitation means being connected to receive a constant excitation, said second excitation means being connected to receive the output of said amplifying means and control the output of said generator in accordance therewith.

4. A servo-system to provide control current to a saturable core impedance device as a linear function of chart travel for a continuously recording instrument having a movable chart and stylus engaging the chart, comprising, in combination, a pair of energized buses, an impedance device adapted to be connected across said buses, said impedance device having a movable tap, coupling means connecting the movable tap of said impedance device to the chart driving means for the continuously recording instrument, amplifying means connected to said tap and thus adapted to have its output controlled in accordance with the position of said movable tap on said impedance device, a generator being connected to vary the control units for the saturable core impedance device, the stylus of the recording device of said continuously recording instrument being connected to have its position determined by the output of the saturable core impedance device, excitation means for said generator, said excitation means being connected to be energized by the output of said amplifying means.

5. A servo-system to provide control current to a saturable core impedance device as a function of chart travel for a continuously recording instrument having a movable chart and a recording stylus energizing the chart, comprising, in combination, a pair of energized buses, a first and a second impedance device connected in parallel with each other and adapted to be connected across said buses, individual movable taps for said first and second impedance devices, coupling means connecting the movable tap for said first impedance device to the chart driving means for the continuously recording instrument, electronic amplifying means having its grid connected to the tap on one of said impedance devices whereby the grid bias is determined by the position of said movable tap on said impedance device and its output current and its limits set by the position of the movable tap of said second impedance device and the magnitude of the voltage across the first and second impedance devices in parallel, a generator being connected to vary the control units for the saturable core impedance device, the stylus of the recording device of said continuously recording instrument being connected to have its position determined by the output of the saturable core impedance device, excitation means for said generator, said excitation means being connected to be energized by the output of said amplifying means.

6. A servo-system to provide control current to a saturable core impedance device as a function of chart travel for a continuously recording instrument having a movable chart and a stylus engaging the chart, comprising, in combination, a pair of energized buses, a first and a second impedance device connected in parallel with each other and adapted to be connected across said buses, individual movable taps for said first and second impedance devices, coupling means connecting the movable tap for said first impedance device to the chart driving means for the continuously recording instrument, amplifying means connected to the movable tap of the first impedance device and thus adapted to have its output controlled in accordance with the position of said movable tap on said first impedance device and its output current and its limits set by the position of the movable tap of said second impedance device and the magnitude of the voltage across the first and second impedance devices in parallel, a generator having its output terminals connected to vary the control units for the saturable core impedance device, the recording device of said continuously recording instrument being connected to have its position determined by the output of the saturable core impedance device, excitation means for said generator, said excitation means being connected to be energized by the output of said amplifying means.

7. A servo-system to provide control current to a saturable core impedance device as a function of chart travel for a continuously recording instrument having a recording stylus controlled by the saturable core impedance device comprising, in combination, a pair of energized buses, a first and a second impedance device connected in parallel with each other and adapted to be connected across said buses, individual movable taps for said first and second impedance devices, coupling means connecting the movable tap for said first impedance device to the chart driving means for the continuously recording instrument, a generator having its output terminals connected to supply the control winding of the saturable core impedance device being tested, a third impedance device connected to receive a voltage determined by the output of said generator, excitation means for said generator, amplifying means interconnected with the tap on one impedance device and the generator excitation means to determine the excitation of said generator and adapted to have its output controlled in accordance with the position of the movable tap on said first impedance device and the voltage across said third impedance device and have the limits of its output determined by the position of the movable tap on the second impedance device and the magnitude of the voltage across the first and second impedance devices in parallel.

8. A servo-system to provide control current to a saturable core impedance device as a function of chart travel for a continuously recording instrument having its recording stylus controlled by the saturable core impedance device comprising, in combination, a pair of energized buses, a first and a second impedance device connected in parallel with each other and adapted to be connected across said buses, individual movable taps for said first and second impedance devices, coupling means connecting the movable tap for said first impedance device to the chart driving means for the continuously recording instrument, a generator connected to supply the control winding of the saturable core impedance device being tested, a third impedance device connected to receive a voltage determined by the output of said generator, excitation means for said generator, a movable tap for said third impedance means, electronic amplifying means connected to determine the excitation of said generator, the grid bias for the input of said electronic amplifier means being determined by the voltage on the components of the grid circuit which comprises a circuit from the movable tap of said first impedance device through a portion of said first and second impedance devices to the movable tap on said second impedance device and the movable tap on said third impedance device through a portion of said third impedance device to the cathode of the input stage.

References Cited in the file of this patent
UNITED STATES PATENTS

| | | |
|---|---|---|
| 1,936,796 | Legg | Nov. 28, 1933 |
| 2,266,358 | De Lanty | Dec. 16, 1941 |
| 2,659,047 | Cherry et al. | Nov. 10, 1953 |